United States Patent
Reeves et al.

(10) Patent No.: US 10,034,168 B1
(45) Date of Patent: Jul. 24, 2018

(54) AUTHENTICATION OVER A FIRST COMMUNICATION LINK TO AUTHORIZE COMMUNICATIONS OVER A SECOND COMMUNICATION LINK

(71) Applicant: Sprint Spectrum L.P., Overland Park, KS (US)

(72) Inventors: Raymond E. Reeves, Oviedo, FL (US); Mark Peden, Olathe, KS (US); Simon Youngs, Overland Park, KS (US); Gary Koller, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 757 days.

(21) Appl. No.: 13/870,629

(22) Filed: Apr. 25, 2013

(51) Int. Cl.
*H04W 12/06* (2009.01)

(52) U.S. Cl.
CPC .................................. *H04W 12/06* (2013.01)

(58) Field of Classification Search
CPC ..... H04W 12/06; H04W 84/12; H04W 12/08; H04W 76/02; H04W 88/06; H04W 92/02; H04W 88/02; H04W 8/18; H04W 48/18; H04W 60/00; H04W 36/14; H04W 80/00; H04W 28/18; H04W 8/005; H04W 4/001
See application file for complete search history.

(56) References Cited

U.S. PATENT DOCUMENTS

| | | | |
|---|---|---|---|
| 5,276,905 A | 1/1994 | Hurst et al. | |
| 5,537,474 A * | 7/1996 | Brown | H04M 3/382 |
| | | | 380/248 |
| 5,818,824 A | 10/1998 | Lu et al. | |
| 5,995,834 A | 11/1999 | Moore | |
| 6,112,088 A | 8/2000 | Haartsen | |
| 6,334,052 B1 | 12/2001 | Nordstrand | |
| 6,477,372 B1 | 11/2002 | Otting et al. | |
| 6,501,951 B2 | 12/2002 | Moore | |

(Continued)

FOREIGN PATENT DOCUMENTS

WO   2006/016841   2/2006

OTHER PUBLICATIONS

Etemad, Kamran et al., "Enhancements on Neighbor Advertisement Message," IEEE 802.16 Broadband Wireless Working Group, Aug. 27, 2004 Access.

*Primary Examiner* — Christopher M Brandt

(57) ABSTRACT

Disclosed are a method, apparatus, and system for authenticating a communication session between a user equipment device (UE) and a communication network. A first authentication of a UE is performed by generating an authentication key, transmitting the authentication key over a first communication link from the UE to a communication network, authenticating the UE using the authentication key, and generating an authentication result indicative of authenticating the UE. A second authentication of the UE is performed to authorize a communication session over a second communication link between the UE and the communication network. The second authentication includes transmitting UE identifying information over the second communication link from the UE to the communication network and authenticating the UE using the UE identifying information and the authentication key. The second communication link is established under an internet protocol. After performing the second authentication, the communication session is authorized.

17 Claims, 5 Drawing Sheets

(56) References Cited

U.S. PATENT DOCUMENTS

| | | | |
|---|---|---|---|
| 6,771,960 B1 | 8/2004 | Otting et al. | |
| 6,801,772 B1 | 10/2004 | Townend et al. | |
| 6,826,414 B1 | 11/2004 | Reynolds et al. | |
| 6,850,744 B2 | 2/2005 | Moore | |
| 6,879,600 B1 | 4/2005 | Jones et al. | |
| 6,970,719 B1 | 11/2005 | McConnell et al. | |
| 7,277,547 B1 | 10/2007 | Delker et al. | |
| 7,328,010 B2 | 2/2008 | Turina et al. | |
| 7,486,966 B2 | 2/2009 | Sayers et al. | |
| 7,489,930 B2 | 2/2009 | Aerrabotu et al. | |
| 7,738,873 B2 | 6/2010 | Jagadeesan et al. | |
| 7,982,583 B1 | 7/2011 | Zhou et al. | |
| 8,027,679 B2* | 9/2011 | Prasad | 455/436 |
| 8,335,188 B1 | 12/2012 | Harris et al. | |
| 8,351,419 B2* | 1/2013 | Guedalia | H04L 12/66 370/352 |
| 2003/0236982 A1* | 12/2003 | Hsu | H04L 63/08 713/171 |
| 2004/0264701 A1 | 12/2004 | Lee et al. | |
| 2005/0113067 A1* | 5/2005 | Marcovici | H04L 63/062 455/411 |
| 2005/0152396 A1 | 7/2005 | Pichna et al. | |
| 2006/0121895 A1* | 6/2006 | Zou | H04L 63/0853 455/433 |
| 2006/0236105 A1* | 10/2006 | Brok et al. | 713/169 |
| 2006/0276189 A1 | 12/2006 | Kiernan et al. | |
| 2008/0260149 A1* | 10/2008 | Gehrmann | 380/247 |
| 2010/0048176 A1* | 2/2010 | Osborn | H01Q 1/246 455/411 |
| 2011/0302643 A1* | 12/2011 | Pichna et al. | 726/7 |
| 2014/0115676 A1* | 4/2014 | Coghlan et al. | 726/6 |

\* cited by examiner

AUTHENTICATION OVER A FIRST COMMUNICATION LINK TO AUTHORIZE COMMUNICATIONS OVER A SECOND COMMUNICATION LINK

BACKGROUND

A typical cellular wireless communication system or network includes a number of antenna systems that radiate radio frequency (RF) radiation patterns to define wireless coverage areas, such as cells and cell sectors. These antenna systems or base stations are in turn coupled to one or another form of controller, which can be coupled to a telecommunications switch or gateway. The switch or gateway may then be coupled with a transport network, such as the public switched telephone network (PSTN) or a packet-switched network (e.g., the Internet).

A user equipment device (UE), such as a smartphone, tablet computer, tracking device, embedded wireless module, and other wirelessly equipped communication devices, can operate in the cells defined by the radiation patterns from the base stations. With the typical wireless communication system described above, a communication channel or link can be established between the UE and the transport network, via the base station, controller, switch or gateway, and possibly other elements. Thus, a UE operating within a coverage area of a base station can engage in air interface communication with the base station and can thereby communicate via the base station with various remote network entities or with other UEs.

In general, the wireless communication system may operate in accordance with a particular cellular air interface protocol or radio access technology. Examples of existing cellular air interface protocols include CDMA (e.g., 1×RTT and 1×EV-DO), LTE (e.g., FDD LTE and TDD LTE), WiMAX, iDEN, TDMA, AMPS, GSM, GPRS, UMTS, EDGE, and MMDS. These and other air interface protocols may define their own procedures for initiation of communications, establishment of communication links, release of communication links, handoff between coverage areas, and other functions related to air interface communication.

Many UEs are also now configured to connect to the transport network through a communication link established with a wireless local area network (WLAN) access point or router of the communication network. For example, a communication link can be formed between a UE and an access point under WLAN air interface protocols, such as Wi-Fi or Bluetooth. These WLAN access points can be separate from or included along with cellular base stations.

Depending on the specific underlying technologies, protocols, and architecture of a given wireless communication system, the various elements or nodes of the system may take different forms and may make up different portions of the wireless communication system. In one example, the base stations, the communication devices, and possibly other elements generally make up a radio access network (RAN) portion of the system. In addition, Wi-Fi routers or access points and possibly other elements generally make up a WLAN portion of the system. Further, controllers, switches, gateways, and perhaps other elements can make up a core network portion of the system. Although, in practice, different elements may overlap in one or more portions of the wireless communication system.

Illustratively, in a CDMA system, the base station is referred to as a base transceiver system (BTS) and the BTS is usually under the control of a base station controller (BSC). Further, each BSC can be coupled to a mobile switching center (MSC) and/or a packet data serving node (PDSN) for instance. In an LTE system, the base station is usually referred to as an eNodeB and a mobility management entity (MME) can be coupled to the eNodeB to coordinate functionality between multiple eNodeBs. Each MME and eNodeB can also be coupled to a serving gateway (SGW) and/or a packet gateway (PGW). In addition, these and potentially other systems can also include WLAN routers, WLAN gateways, and other components to facilitate WLAN communication links between UEs and the communication system.

Other architectures and operational configurations of the wireless communication system are possible as well.

OVERVIEW

Generally, a UE can connect to a wireless communication network through communication links established under one or more air interface protocols. In one example, a UE can connect to the network through communication links under multiple air interface protocols, such as cellular air interface protocols and WLAN air interface protocols. This capability of the UE to connect to the communication network under these different air interface protocols allows communications, such as voice communications, to be offloaded from CDMA/LTE cellular networks, for example, and instead engaged in through broadband networks via WLAN access points.

Further, engaging in voice communications over broadband networks can help a cellular subscriber manage their usage of voice call minutes over cellular networks. Commonly, a cellular subscription is associated with a monthly limit on voice call minutes over cellular networks and additional charges can be assessed if the cellular subscriber exceeds the limit on such cellular voice call minutes. Broadband networks can also be used to engage in voice communications when the UE is out of cellular coverage or when the UE is in a roaming scenario. Generally, additional usage charges can be incurred if the UE were to engage in voice communications while roaming.

WLAN access points are being deployed fairly ubiquitously in a wide range of environments, including, for example, homes, offices, and/or other public environments such as restaurants, hotels, airports, and the like. This increases the availability of the option to engaging in voice or data communications over broadband networks. However, some issues that have been raised relating to a UE engaging in communications through broadband networks include how to determine whether the UE is authorized to engage in such communications over the broadband networks and whether such communications incur charges to a valid and active account associated with the UE. For example, a UE in a roaming scenario may still incur charges when engaging in communications with the network through a WLAN access point, although, such charges may be different than charges incurred when the UE engages in cellular communications while roaming.

The present disclosure helps to address such issues by allowing a UE to engage in a communication session, such as a voice communication session, over a broadband network only after the UE is first authenticated. The UE may also need to be associated with a valid subscription or account, for example, a cellular voice subscription, before allowing the UE to engage in the communication session over the broadband network.

In one example, a UE is associated with a CDMA or other cellular subscription or account. In this example, the UE is first authenticated by performing a voice authentication session over a cellular communication link between the UE and the communication network. The voice authentication session can take various forms but generally includes the UE generating an authentication key and exchanging the authentication key with an authentication node of the network. The authentication node uses the authentication key to authenticate the UE. The authentication node can also use the authentication key or some other information about the UE to identify the account that is associated with the UE. The authentication node may store authentication information relating to whether the UE has been authenticated and any accounts associated with the UE. This authentication information can be used to authorize the UE to engage in further communications over the cellular communication link. In addition, this authentication information can also be sent to the UE, in one form or another, and used to authorize the UE to engage in a communication session over a broadband network.

More particularly, when the UE seeks to engage in a communication session over a WLAN communication link (e.g., a voice over internet protocol (VoIP) communication session), the UE is requested to provide authentication information indicating that a prior voice authentication session was successfully performed. Once the authentication information is received from the UE, the voice communication session over the WLAN communication link can be authorized and enabled. Thus, a first authentication performed over a first communication link can be used to authenticate a communication session over a second communication link. Further, the communication session over the second communication link can be properly billed, as needed, to an account associated with a UE engaged in the communication session.

These as well as other aspects, advantages, and alternatives will become apparent to those of ordinary skill in the art by reading the following detailed description, with reference where appropriate to the accompanying drawings. Further, it should be understood that the disclosure provided by this overview and the other description throughout this document is intended to illustrate the invention by way of example only and that numerous variations may be possible.

DETAILED DESCRIPTION

Figure 1:
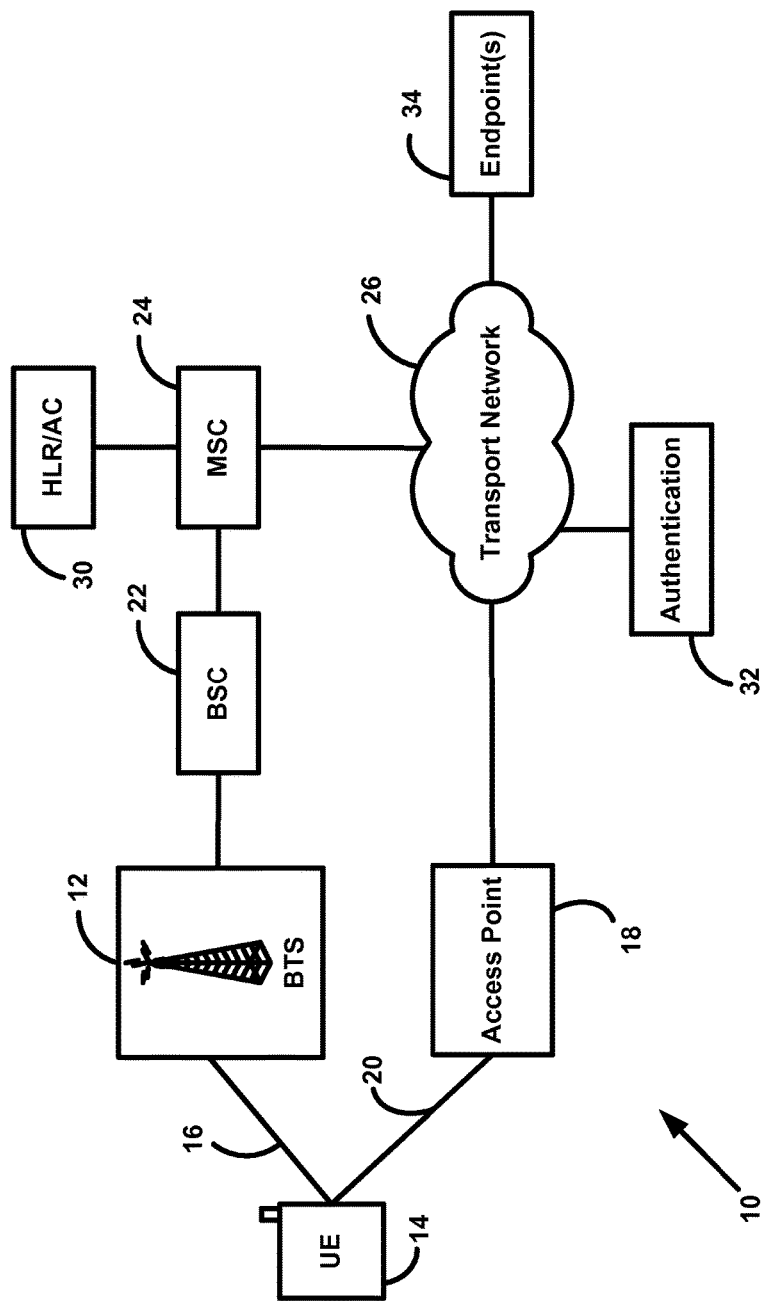
FIG. 1 is a block diagram of a simplified wireless communication network according to one embodiment of the present disclosure.

The present disclosure will be described by way of example in a scenario where a first authentication of a UE is performed over a first communication link and a result of the first authentication is used to authenticate the UE for a communication session over a second communication link. Referring to the drawings, FIG. 1 is an example block diagram of a wireless communication network 10 that may be used in a CDMA system. It is to be understood, however, that other network architectures could be used in other examples.

As generally illustrated in FIG. 1, the wireless communication network 10 includes a BTS 12 that radiates to provide an RF coverage area within which a UE 14 can operate. The UE 14 can be a mobile phone that is configured to connect to the BTS 12 through a wireless communication link 16. The communication link 16 can be established under a cellular air interface protocol, such as CDMA, LTE, or GSM.

The wireless communication network 10 also includes an access point 18. The access point 18 can be a wireless access point that provides a coverage area within which the UE can operate. In the present example, the UE 14 can be a mobile phone that is configured to connect to the access point 18 through a communication link 20. The communication link 20 can be established under an air interface protocol such as 802.11 (Wi-Fi), HiperLAN, HomeRF, or Bluetooth.

As further illustrated, the BTS 12 is coupled with a BSC 22, which controls signaling over the RF air interface between the BTS and the UE 14. In the present example, the BSC 18 is further coupled with an MSC 24, which provides connectivity to a transport network 26. Generally, the transport network 26 can include the PSTN or a packet-switched network (e.g., the Internet). In one example, the MSC 24 provides connectivity to the PSTN. FIG. 1 also illustrates that the access point 18 is configured to provide connectivity to the transport network 26, which in one example is the Internet.

Conventionally, the MSC 24, monitors cellular calls and is coupled via a carrier's signaling network (not shown) with a home location register (HLR)/authentication center (AC) 30. In one example, the MSC 24 and HLR/AC 30 communicate with each other according to the messaging and procedures defined by ANSI-41 or other known industry standards. In the present example, the HLR/AC 30 and MSC 24 can work together to authenticate the UE 14 seeking to gain RF connectivity so as to be able to communicate via the carrier's system via the BTS 12. One example of such an authentication process is the ANSI-41 or IS-41 voice authentication process or session. As such, the MSC 24 and the HLR/AC 30 can generally function as authentication nodes of the network.

In accordance with the present disclosure, an further authentication node 32 is coupled to the transport network and is configured to authenticate the UE 14 when the UE seeks to gain connectivity to the Internet through the access point 18. In one example, the authentication node 32 can be an authentication, authorization, and accounting (AAA) server. In this example, the access point 18 may communicate with the AAA server using a protocol such as RADIUS or DIAMETER. In another example, the authentication node 32 can be a mobility management entity (MME). Generally, an AAA server might be used in a CDMA network and an MME might be used in an LTE network.

In another example, the authentication node 32 can communicate with the HLR/AC 30 through the transport network 26 to authenticate the UE 14 for a communication session, such as a VoIP communication session, through the access point 18. More particularly, the authentication node 32 can authenticate the UE 14 using a result from the voice authentication process performed when the UE was seeking RF connectivity via the BTS 12.

Using the simplified network configuration of FIG. 1, the UE 14 can engage in communication sessions with one or more endpoints 34 via the base station 12 and/or the WLAN access point 18. The endpoint(s) 34 may include, for example, one or more voice-over-packet (VoP) communication devices, e-mail servers, messaging servers, streaming media servers, gaming servers, and/or Web servers. In one example, the endpoint(s) 34 are communicatively coupled to the transport network 26, which can be a packet-switched network. Thus, generally a communication session between the UE 14 and the endpoint(s) 34 may involve the exchange of packets containing voice, video, text, or other data. In one particular example, the communication session is a VoIP session or a voice over Wi-Fi (VoWiFi) communication session.

However, before the communication session between the UE 14 and the endpoints 34 can be enabled through the access point 18, the UE may have to be authenticated. In one example, the UE may have to be authenticated and associated with a valid cellular service subscription to enable certain services, e.g., VoIP services while the UE is roaming.

Although FIG. 1 shows the BTS 12 and the access point 18 serving one UE 14, it is to be understood, that a BTS and an access point may serve a greater or fewer number of user devices at a particular point in time. Generally, in practice, the wireless communication network 10 may include a plurality of UEs 14, BTSs 12, access points 18, other network entities or nodes, and/or transport networks 26, it being understood that FIG. 1 only represents one non-limiting arrangement of the network.

Figure 2:
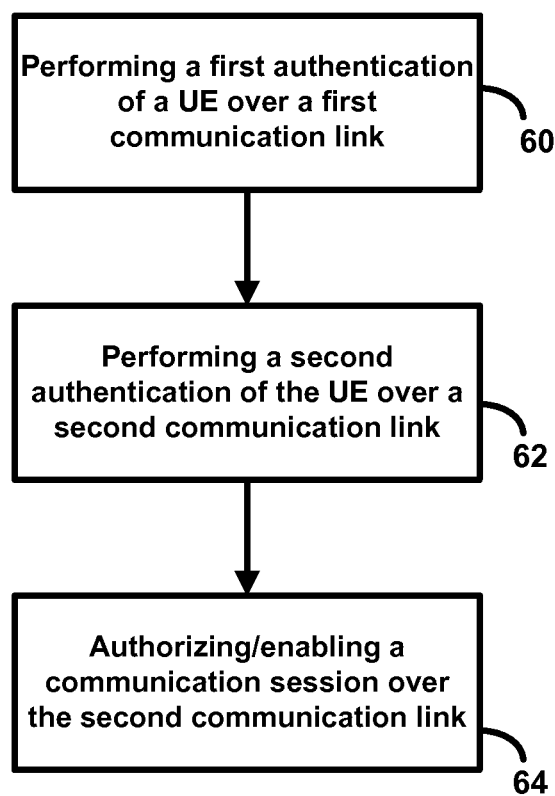
FIG. 2 is a flow chart depicting functions that can be carried out in accordance with an embodiment of the present disclosure.

Referring now to FIG. 2 and with further reference to FIG. 1, at block 60, a UE 14 performs a first authentication over a first communication link. In this example, the first communication link is the link 16 through the BTS 12 and the first authentication can be performed in accordance with a voice authentication session with the HLR/AC 30 and the MSC 24.

In one example of the first authentication, the UE 14 has a unique Electronic Serial Number (ESN) and a unique Mobile Identification Number (MIN). The ESN, which may be hard-coded into the UE, identifies the UE as a unique physical device and usually includes a manufacturer code and a manufacturer-assigned serial number. The MIN, on the other hand, is typically assigned to the UE by a cellular carrier and can function as a subscriber ID. Further, the UE 14 may be assigned a special master authentication key (A-key), for use in validating its identity. In some scenarios, the master authentication A-key is used to generate shared secret data (SSD), which in turn is used in validating the identity of the UE 14.

Further, the HLR/AC 30 may also contain or otherwise access information that indicates radio access data, such as MIN, ESN, A-key, or SSD, for UEs authorized for service in the serving area covered by HLR/AC. The HLR/AC 30 and MSC 24 may be programmed to engage in the authentication process based on this access data when a UE seeks to gain RF connectivity.

Thus, by way of example, when the UE 14 seeks to register in the serving system of the MSC 24, the UE sends an ANSI-41 Registration Request (REGREQ) message via the communication link 16, and via the BTS 12 and BSC 22, to the MSC 24. In the present example, the Registration Request message includes (i) the MIN/ESN pair, (ii) an authentication result (AUTHR) that the UE 14 computed using a predefined algorithm as a function of its MIN, ESN, SSD, and perhaps other data, and (iii) one or more other parameters, such as a random number (RANDC) previously broadcast by the serving MSC 24 to the UE.

Upon receipt of the Registration Request, the MSC 24 may pre-validate the UE 14 by checking to ensure that the random number (RANDC) provided by the UE is correct. In turn, the MSC 24 sends an ANSI-41 Authentication Request (AUTHREQ) message to the HLR/AC 30, providing the HLR/AC with the MIN/ESN pair and the authentication result AUTHR. The HLR/AC 30 validates the MIN/ESN pair to ensure that it is a valid pair. Further, the HLR/AC 30 computes its own AUTHR, applying the same predefined algorithm as a function of the MIN, ESN and the SSD that the HLR/AC has on record for the UE 14, and sends the AUTHR in an AUTHREQ return result message to the MSC 24. The MSC 24 compares the HLR/AC-computed AUTHR with the UE-computed AUTHR. If they match, then the MSC 24 authenticates the UE 14 and may grant the RF access to the UE. Otherwise, the MSC 24 may deny the access request. In another example, instead of the MSC 24 performing the determination, the HLR/AC 30 determines whether the AUTHR values match and informs the MSC 24 to grant or not grant access to the UE 14 based on the result.

A result of the first authentication can be stored in a data register or some other memory so that this first authentication result can be accessed by an authentication node to perform a second authentication, as will be described in more detail hereinafter. More particularly, the first authentication result may indicate that the authentication process has been successfully performed or completed for a UE. Further, the first authentication result may be associated with identifying information regarding the UE (such as one or more of a MIN, ESN, A-key, or SSD associated with the UE). In another example, the first authentication result can be time-stamped or otherwise identified so that it is valid for only a limited time period, e.g., an hour, a day, a week, etc. Although, in this example, the first authentication result can become invalid for reasons other than the expiration of a time period.

The first authentication may also include the HLR/AC 30 associating the UE 14 with an active cellular service subscription. For example, the HLR/AC 30 can associate the MIN/ESN pair of the UE or the UE-computed AUTHR with a customer's cellular service subscription. This subscription or account information can be stored along with the authentication result or otherwise associated therewith to later link the UE with the service subscription when the UE seeks to engage in a communication session via the access point 18.

Referring now to block 62, before the communication session between the UE 14 and the endpoints 34 can be enabled through the access point 18, the UE performs a second authentication over a second communication link. In this example, the second communication link is the link 20 through the access point 18 and the second authentication can use a result from the first authentication performed at block 60.

More particularly, when the UE seeks to engage in a communication session through the access point 18, the UE sends a Registration Request message through the communication link 20, and via the access point 18 and transport network 26, to the authentication node 32. This Registration Request message can include (i) the MIN/ESN pair and (ii) the authentication result (AUTHR) that the UE 14 computed using a predefined algorithm as a function of its MIN, ESN, SSD, and perhaps other data. In one example, the MIN/ESN pair and AUTHR are the same as the values that the UE sent during the first authentication request. Upon receipt of the Registration Request, the authentication node 32 can communicate with the HLR/AC 30 or otherwise access the first authentication result to authenticate the MIN/ESN pair and AUTHR sent in response to the second authentication request. If the MIN/ESN pair and AUTHR sent in response to the second authentication request match the results of the first authentication, then an authentication confirmation can be communicated to the authentication node 32, which, in turn, at block 64, can authorize or enable the communication session through the access point 18.

In another example, the UE can send any other identification information, which can but does not have to include the MIN/ESN pair and AUTHR. In any event, the identification information sent by the UE during the second authentication is used to determine whether a first authentication result is available and valid for the UE to enable the communication session through the access point 18.

At blocks 62 or 64, the authentication node 32 can also associate the UE 14 with an active cellular service subscription. This step can be performed to enable certain communications by the UE 14 through the access point 18, such as VoIP communications while the UE is roaming. Thus, the service subscription can be charged, as needed, for such services.

Although blocks 60-64 are illustrated in sequential order in FIG. 2, these blocks may also be performed concurrently or in a different order than illustrated. More particularly, block 60, 62 may be performed separately or substantially concurrently in different embodiments of the present disclosure. The method of FIG. 2 may also include additional or fewer blocks, as needed or desired. For example, the various blocks 60-64 can be combined into fewer blocks, divided into additional blocks, and/or removed based upon a desired implementation.

Figure 3:
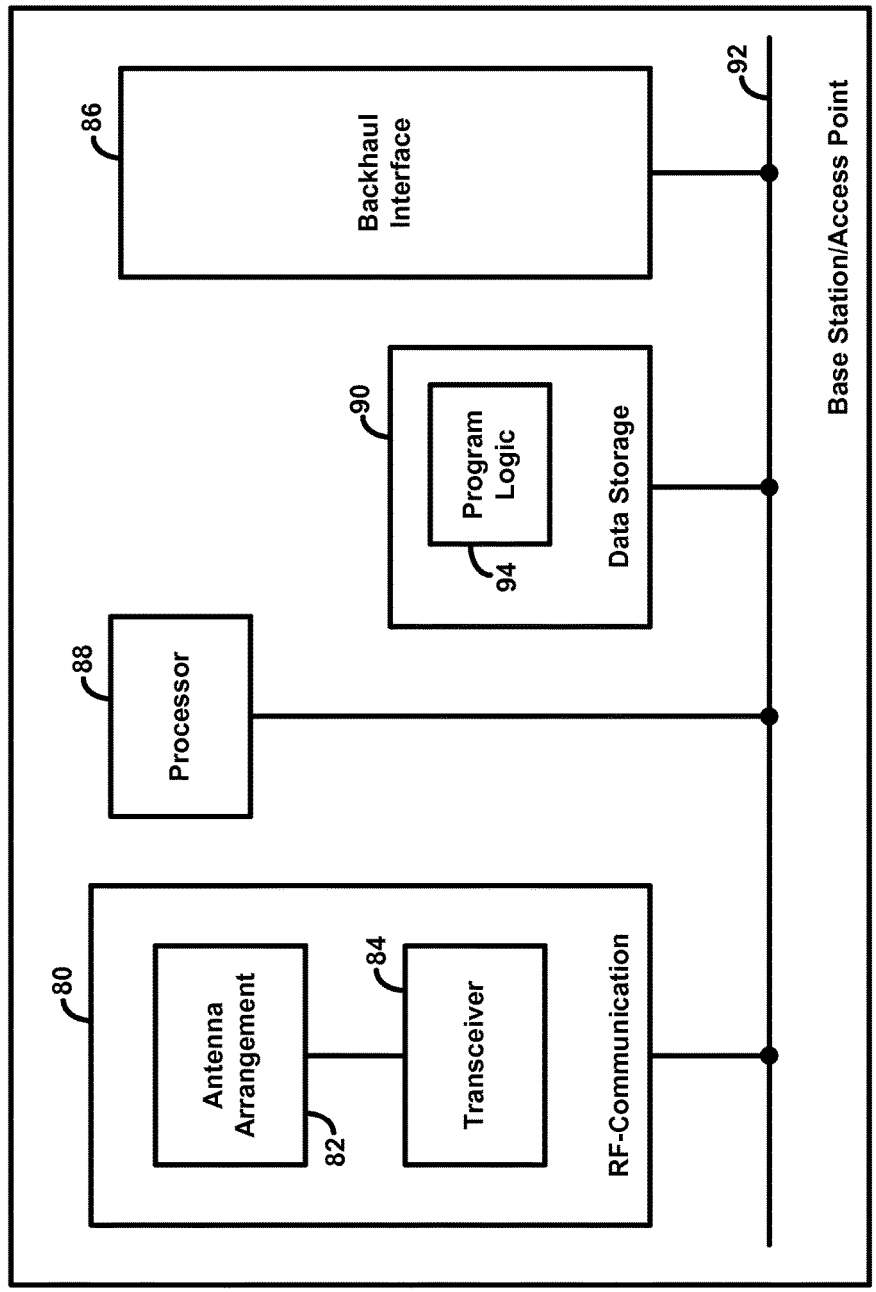
FIG. 3 is a block diagram of an example base station or access point operable within the network of FIG. 1.

Referring now to FIG. 3, a block diagram of a base station or WLAN access point is illustrated showing some of the functional components that each base station or access point may include in the arrangement of FIG. 1. In practice, base stations and WLAN access points can include different components, although in some cases the base station includes WLAN access point components. In any event, FIG. 3 illustrates components that are generally utilized in a base station or a WLAN access point. As shown, the base station/access point includes for each of its one or more coverage areas an RF communication block 80 that includes a respective antenna arrangement 82 and transceiver 84, a backhaul interface 86, a processor 88, and non-transitory data storage 90, all of which may be communicatively linked together by a system bus, network, or other connection mechanism 92.

The antenna arrangement 82 may include one or more antennas arranged in a manner now known or later developed for radiating to define a wireless coverage area. The antenna arrangement may be mounted at the top of an antenna tower in the case of a macro-base station, on a femtocell in the case of a small base station, or on a router in the case of a WLAN access point. Indeed, the antenna arrangement can be provided in other manners or locations in other examples. Transceiver 84, in turn, preferably comprises a power amplifier, modem chipset, channel cards, and other circuitry for sending and receiving communications via the antenna arrangement 82 in accordance with the agreed cellular or WLAN air interface protocol.

The backhaul interface 86 comprises a mechanism for communicatively linking the base station or WLAN with other nodes of the network. Thus, the backhaul interface 86 may provide a communication link interface between the base station or access point and the BSC or the transport network. These communication links can be direct links or may include one or more intermediate nodes. In any event, the backhaul interface 86 may take whatever form is necessary to couple with the communication links to other network nodes.

The processor 88 may include one or more general purposes processors (e.g., INTEL microprocessors) and/or one or more special purpose processors (e.g., dedicated digital signal processors or application specific integrated circuits). If the processor comprises multiple processors, the processors may work separately or in combination (e.g. in parallel). Further, the functions of the processor 88 can be integrated in whole or in part with the transceiver 84 or with one or more other aspects of the base stations.

The data storage 90, in turn, may include one or more volatile and/or non-volatile storage components, such as magnetic, optical, or organic storage components, which can be integrated in whole or in part with the processor 88. As shown, the data storage 90 may contain program logic 94, which can be executed by the processor 88 to carry out certain functions of the base station or access point described herein, for example, the functions described with reference to FIGS. 1 and 2.

Figure 4:
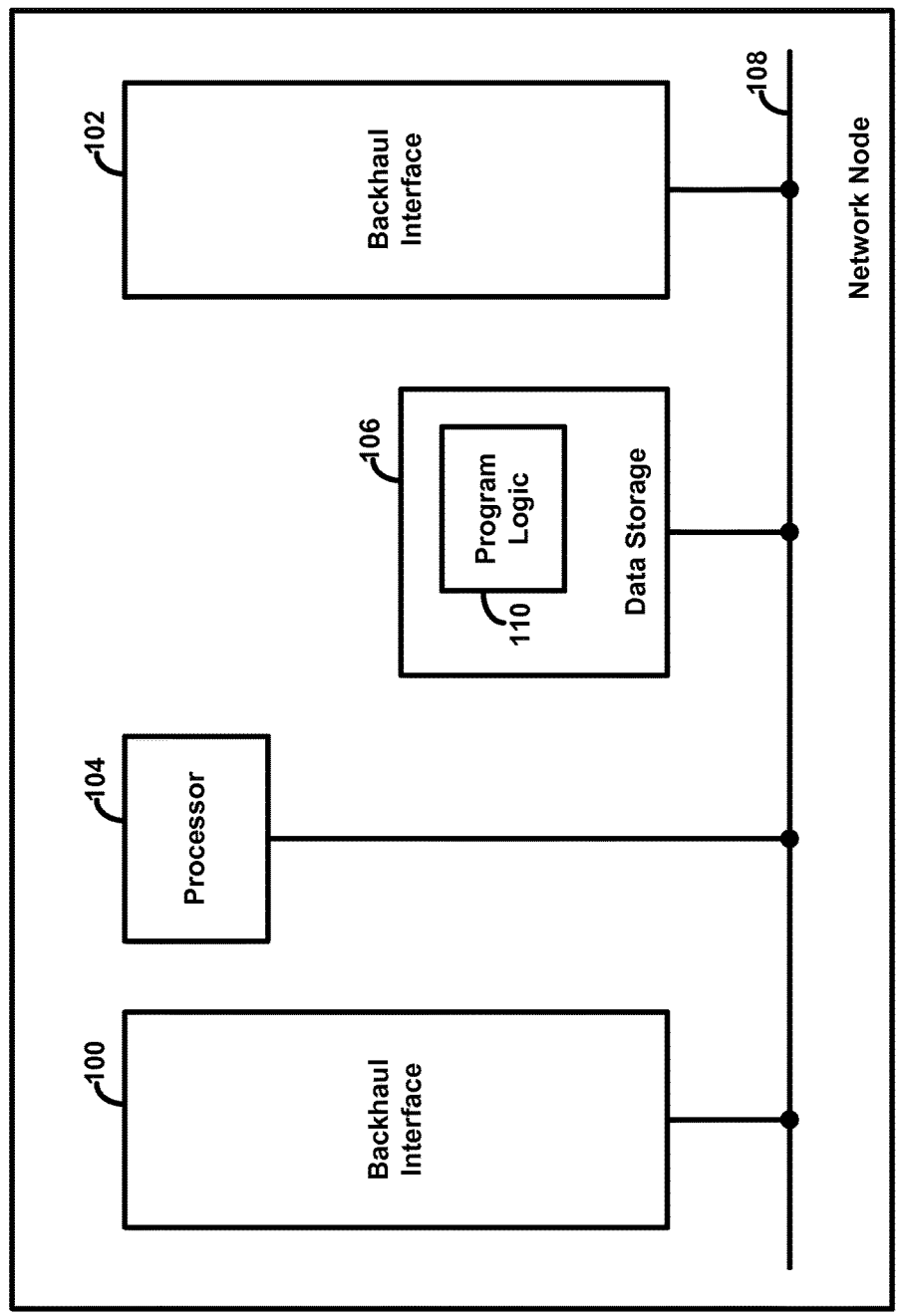
FIG. 4 is a block diagram of an example network node operable within the network of FIG. 1.

FIG. 4 is a block diagram of a network node, for instance a BSC, MSC, HLR/AC, or other authentication node showing some of the functional components that the node may include in the arrangement of FIG. 1. As shown, the network node may include a first backhaul interface 100, a second backhaul interface 102, a processor 104, and non-transitory data storage 106, all of which may be communicatively linked together by a system bus, network, or other connection mechanism 108.

The first backhaul interface 100 functions to provide direct or indirect connectivity with base stations/access points and particularly with the backhaul interface 86 of each base station/access point, so as to facilitate communication of control signaling between the network node and each base station/access point. As with the backhaul interface 86 of FIG. 3, the first backhaul interface 100 of the network node may be arranged for wired and/or wireless backhaul communication and may take various forms depending on the links that connect the network node with each base station or access point. For example, the first backhaul interface 100 may connect an MSC with one or more BSCs or may connect an HLR/AC with an MSC.

The second backhaul interface 102 functions to provide connectivity with other network nodes and/or with a transport network. For instance, if the network node is an authentication node, the second backhaul interface 102 may connect with a communication link to a transport network. Other examples are possible as well.

As with the base station/access point processor 90, the network node processor 104 may include one or more general purposes processors and/or one or more special purpose processors. The data storage 106, in turn, may include one or more volatile and/or non-volatile storage components, such as magnetic, optical, or organic storage components, which can be integrated in whole or in part with the processor 104. As shown, the data storage 106 may contain program logic 110, which can be executed by the processor 106 to carry out various core network entity functions described herein.

Figure 5:
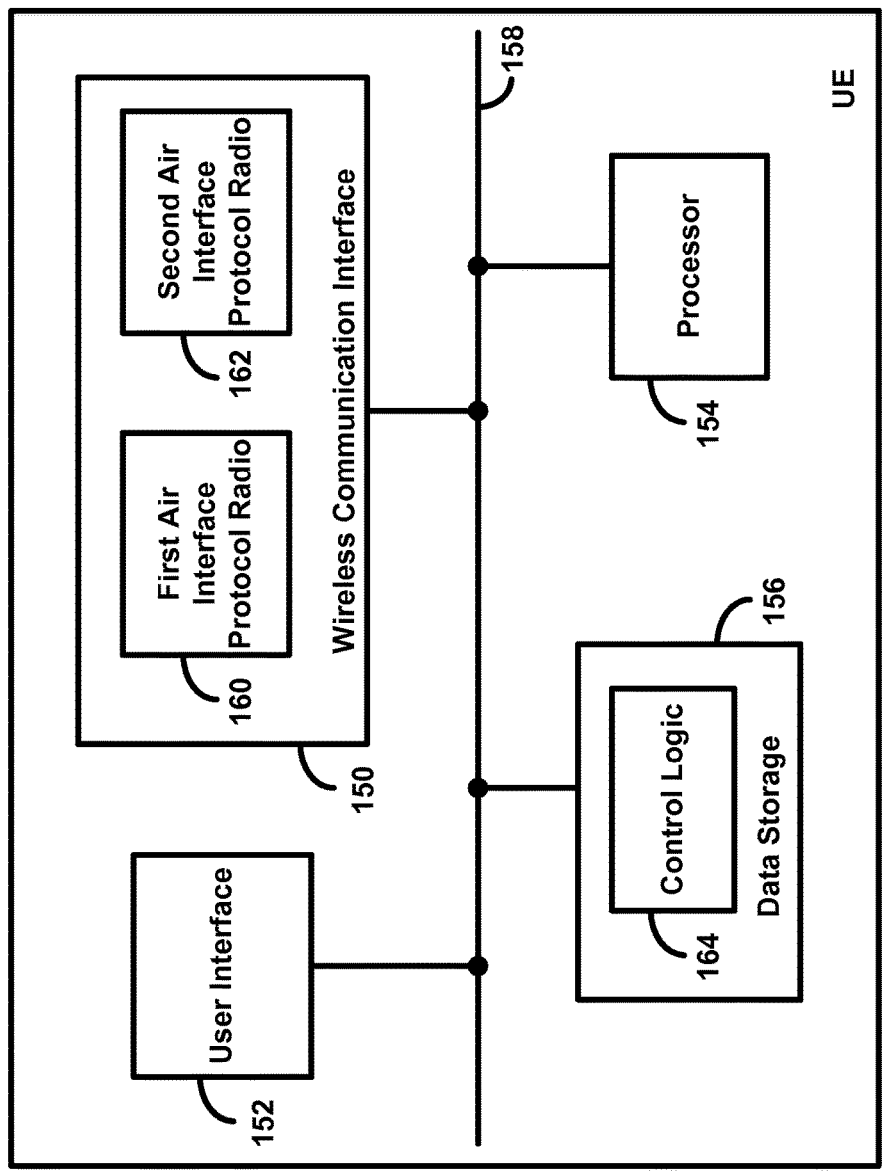
FIG. 5 is a block diagram of an example UE operable within the network of FIG. 1.

FIG. 5 is next a simplified block diagram showing functional components that can be included in the representative UE 14 to facilitate implementation of the present disclosure. Example UEs that may include these functional components include, without limitation, a mobile phone, a wirelessly-equipped tablet, notebook, or other computer, a package tracking device, and a wireless communication module embedded in a vehicle, appliance, or other device. Numerous other examples are possible as well, and still others may be developed in the future.

As shown in FIG. 5, a representative UE includes a wireless communication interface 150, a user interface 152, a processor 154, and data storage 156, all of which may be communicatively linked together by a system bus, network, or other connection mechanism 158.

Wireless communication interface 150 is shown by way of example including two radios 160, 162, one of which is configured to engage in communication under a first air interface protocol, and the other of which is configured to engage in communication under a second air interface protocol. In line with the discussion above, for instance, radio 160 may be a cellular radio and radio 162 may be a WLAN radio. Other examples are possible as well. Further, although the figure shows these two radios as discrete blocks, in practice they may be integrated together. For instance, the radios may be provided as functions on a single chipset. Still further, although not shown expressly, each radio may include an associated antenna, or the radios may share a common antenna.

Radio 160 and/or radio 162 may include control logic arranged to carry out various UE functions described herein. For instance, a radio chipset may itself include a processor and stored logic executable by the processor to carry out the described functions. Alternatively, a radio chipset may be otherwise configured as an application specific integrated circuit or the like to carry out the described functions.

User interface 152 in turn functions to receive input from a user and to provide output to a user, if the UE is to be operated by an end-user. As such, the user interface may include input components such as a keypad, touchpad, touch-sensitive display, microphone, and camera, and the user interface may further include output components such as a display screen and a sound speaker or headset jack.

Processor 154 may include one or more general purpose processors and/or one or more special purpose processors (e.g., application specific integrated circuits or the like) and may be functionally integrated in whole or in part with wireless communication interface 150 or other UE components. Data storage 156 may then include one or more volatile and/or non-volatile storage components, such as optical, magnetic, flash, or organic storage components, and may be integrated in whole or in part with processor 154. As shown, representative data storage 156 includes control logic 164 executable by processor 154 to carry out various UE functions described herein, instead of or in addition to having a radio processor implement the control logic.

In practice, with this arrangement, when radio 160 is operating under a first air interface protocol (e.g., a cellular network protocol), the control logic 64 can be executed to perform a first voice authentication of the UE. When radio 162 is operating under a second air interface protocol, (e.g., a WLAN protocol), the control logic 64 can be executed to perform a second voice authentication that uses a result of the first authentication to authorize a communication session established through the radio 162.

An illustrative embodiment has been described above. It should be understood, however, that variations from the embodiment discussed are possible, while remaining within the true spirit and scope of the invention as claimed.

For example, the present disclosure has been discussed primarily in relation to a CDMA network with Wi-Fi or other WLAN capabilities. However, other network architectures may also be used to implement the concepts disclosed herein. Illustratively, an LTE network can also use be used to use a first cellular voice authentication for a subsequent VoIP communication session.

We claim:
1. A method comprising:
performing a first authentication of a user equipment device (UE), wherein performing the first authentication includes performing a cellular voice authentication session for authorizing voice communication over a first communication link, and wherein performing the cellular voice authentication session includes:
generating, by the UE, an authentication key;
transmitting the authentication key over the first communication link from the UE to a communication network, wherein the first communication link is established under a first air interface protocol, and wherein the first air interface protocol is a cellular network protocol;
authenticating, by one or more authentication nodes of the communication network, the UE using the authentication key; and
generating, responsive to authenticating the UE using the authentication key, an authentication result that is indicative of the first authentication being successfully completed to authorize voice communication over the first communication link;
storing, by the one or more authentication nodes, the authentication result;
performing a second authentication of the UE to authorize a communication session over a second communication link between the UE and the communication network, wherein performing the second authentication includes transmitting UE identifying information over the second communication link from the UE to the communication network, and authenticating, by the one or more authentication nodes, the UE using the UE identifying information and the stored authentication result, wherein the second communication link is established under an internet protocol, and wherein the internet protocol is a wireless local area network protocol; and
authorizing the communication session after performing the second authentication.

2. The method of claim 1, wherein performing the first authentication further includes determining that the UE is associated with an active cellular service subscription, and wherein authorizing the communication session includes associating the communication session with the active cellular service subscription.

3. The method of claim 1, wherein performing the first authentication includes performing a cellular voice authentication session under an IS-41 specification.

4. The method of claim 1, wherein performing the first authentication includes generating a second authentication key by the authentication node, wherein the authentication node compares the first-named authentication key and the second authentication key to perform the first authentication.

5. The method of claim 2, wherein the communication session is a voice over internet protocol communication session, and wherein associating the communication session with the active cellular service subscription includes associating the voice over internet protocol communication session with the active cellular service subscription, and wherein the method further includes billing the active cellular service subscription for the voice over internet protocol communication session.

6. The method of claim 1, wherein the authentication result is time-stamped and becomes invalid after expiration of a limited time period.

7. A user equipment device (UE) comprising:
- a first radio for establishing a first wireless communication link between the UE and a communication network, wherein the first radio operates under a first air interface protocol, wherein the first air interface protocol is a cellular network protocol;
- a second radio for establishing a second wireless communication link between the UE and the communication network, wherein the second radio operates under a second air interface protocol, wherein the second air interface protocol is a wireless local area network protocol; and
- control logic operable to:
  - perform a first authentication of the UE, wherein performing the first authentication includes performing a cellular voice authentication session for authorizing voice communication over the first wireless communication link, and wherein performing the cellular voice authentication session includes generating an authentication key, and transmitting the authentication key and UE identifying information to the communication network over the first wireless communication link, wherein the communication network is configured to authenticate the UE using the authentication key and the UE identifying information, and to generate, responsive to authenticating the UE using the authentication key and the UE identifying information, an authentication result indicative of the authentication of the UE being successfully completed to authorize voice communication over the first wireless communication link;
  - perform a second authentication of the UE to authorize a communication session over the second wireless communication link, wherein the second authentication includes transmitting the UE identifying information over the second wireless communication link to the communication network, wherein the communication network is configured to authenticate the UE using the same UE identifying information used to perform the first authentication and the authentication result; and
  - responsive to performing the second authentication, engage in the communication session.

8. The UE of claim 7, wherein the first authentication associates the UE with an active cellular service subscription, and wherein engaging in the communication session includes associating the communication session with the active cellular service subscription.

9. The UE of claim 7, wherein the first authentication includes performing a cellular voice authentication session under an IS-41 specification.

10. The UE of claim 7, wherein the first authentication includes generating the authentication key using a master authentication key.

11. The UE of claim 7, wherein the second air interface protocol is a voice over internet protocol.

12. A communication network comprising:
- a user equipment device (UE);
- a wireless local area network (WLAN) access point;
- a base station; and
- an authentication node,
  - wherein the UE is configured to communicate with the base station to establish a first communication link between the UE and the communication network, wherein the first communication link is established under a cellular network protocol,
  - wherein the UE is configured to communicate with the WLAN access point to establish a second communication link between the UE and the communication network, wherein the second communication link is established under a WLAN protocol,
  - wherein the UE and the authentication node are configured to perform a first authentication of the UE, wherein performing the first authentication of the UE includes performing a cellular voice authentication session for authorizing voice communication over the first communication link, wherein performing the cellular voice authentication session includes:
    - generating, by the UE, an authentication key;
    - transmitting the authentication key over the first communication link from the UE to the communication network;
    - authenticating the UE using the authentication key;
    - generating, responsive to authenticating the UE using the authentication key, an authentication result indicative of the authentication of the UE being successfully completed to authorize voice communication over the first communication link; and
    - storing, by the authentication node, the authentication result,
  - wherein the UE is configured to perform a second authentication of the UE to authorize a communication session over the second communication link, wherein performing the second authentication includes transmitting UE identifying information over the second communication link from the UE to the communication network and authenticating, by the authentication node, the UE using the UE identifying information and the stored authentication result, and
  - wherein the UE is configured to engage in the communication session after performing the second authentication.

13. The communication network of claim 12, wherein the first authentication associates the UE with an active cellular service subscription, and wherein engaging in the communication session includes associating the communication session with the active cellular service subscription.

14. The communication network of claim 12, wherein the first authentication includes performing a cellular voice authentication session under an IS-41 specification.

15. The communication network of claim 12, wherein the first authentication includes generating a second authentication key by the authentication node, and comparing, by the authentication node, the first-named authentication key and the second authentication key to perform the first authentication.

16. The communication network of claim 12, wherein the first air interface protocol is CDMA and the WLAN protocol is a voice over Wi-Fi protocol.

17. The communication network of claim 12, wherein the authentication result is time-stamped and becomes invalid after expiration of a limited time period.

* * * * *